US010299428B2

(12) United States Patent
Aikala

(10) Patent No.: US 10,299,428 B2
(45) Date of Patent: May 28, 2019

(54) PLANTING SEEDLINGS

(71) Applicant: Risutec Oy, Nakkila (FI)

(72) Inventor: Jussi Aikala, Nakkila (FI)

(73) Assignee: Risutec Oy, Nakkila (FI)

( * ) Notice: Subject to any disclaimer, the term of this patent is extended or adjusted under 35 U.S.C. 154(b) by 109 days.

(21) Appl. No.: 15/523,390

(22) PCT Filed: Oct. 29, 2015

(86) PCT No.: PCT/FI2015/050747
§ 371 (c)(1),
(2) Date: Apr. 30, 2017

(87) PCT Pub. No.: WO2016/066903
PCT Pub. Date: May 6, 2016

(65) Prior Publication Data
US 2017/0265378 A1  Sep. 21, 2017

(30) Foreign Application Priority Data

Oct. 31, 2014  (FI) ..................................... 20145957

(51) Int. Cl.
*A01C 11/02* (2006.01)
*A01G 9/029* (2018.01)
*B65G 25/08* (2006.01)

(52) U.S. Cl.
CPC ............ *A01C 11/025* (2013.01); *A01C 11/02* (2013.01); *A01G 9/0299* (2018.02); *B65G 25/08* (2013.01)

(58) Field of Classification Search
CPC ....... A01C 11/00; A01C 11/02; A01C 11/025; A01G 9/0299; A01G 23/04; B65G 25/02
(Continued)

(56) References Cited

U.S. PATENT DOCUMENTS 1,965,868 A * 7/1934 Vickers .................. F27B 9/208
                                                        198/774.1
4,597,343 A * 7/1986 Nambu .................. A01C 11/02
                                                        111/105
(Continued)

FOREIGN PATENT DOCUMENTS

DE        10001308 A1    8/2001
EP         0806131 A1   11/1977
(Continued)

OTHER PUBLICATIONS

Finnish Patent and Registration Office, FI20145957, Notice of Allowance, dated May 5, 2015.

*Primary Examiner* — Alicia Torres
(74) *Attorney, Agent, or Firm* — Berggren LLP

(57) ABSTRACT

The invention relates to a method in a seedling planting machine and to a seedling planting machine, in which, seedlings are extracted from a seedling storage. In the method, the seedling storage is held in its place on a storage track of the planting machine with first holding elements by a first toothed bar. The seedling storage is transferred on the storage track of the planting machine by moving second holding elements by a second toothed bar, in relation to the first holding elements and to the storage track, so that the seedling storage comes into contact with the second holding elements. The seedling storage is transferred by the second holding elements a transfer distance forward on the storage track. The seedling storage is transferred by the first holding elements, and the seedling storage is detached from the second holding elements.

15 Claims, 3 Drawing Sheets

(58) Field of Classification Search
USPC .................. 198/774.1, 750.14, 463.3, 468.6
See application file for complete search history.

(56) References Cited

U.S. PATENT DOCUMENTS 5,596,938 A * 1/1997 Shaw .................. A01C 11/025
                                                                                      111/100
2011/0179982 A1    7/2011  Faulring

FOREIGN PATENT DOCUMENTS

| | | |
|---|---|---|
| EP | 0900516 A1 | 3/1999 |
| EP | 1472923 A1 | 11/2004 |
| FI | 126005 B | 5/2016 |
| JP | 2009183284 A | 8/2009 |
| WO | 8706791 A1 | 11/1987 |
| WO | 9504451 A1 | 2/1995 |
| WO | 0038996 A1 | 7/2000 |
| WO | 03063577 A2 | 8/2003 |
| WO | 2013190176 A1 | 12/2013 |

* cited by examiner

PLANTING SEEDLINGS

PRIORITY

This application is a U.S national application of the international application number PCT/FI2015/050747 filed on Oct. 29, 2015 and claiming priority of Finnish national application FI20145957 filed on Oct. 31, 2014, the contents of all of which are incorporated herein by reference.

TECHNICAL FIELD OF THE INVENTION

The invention relates to a method in a seedling planting machine and a seedling planting machine according to the preambles of the independent claims presented further below. The invention relates especially to a new way of handling seedling storages of a seedling planting machine.

PRIOR ART

With a typical seedling planting machine tree seedlings are planted into the soil. For example, spruce, pine, eucalyptus or sugar cane seedlings have a root ball with them. In a typical tree seedling planting, a hummock is formed to the soil, and a hole is formed to the hummock by a planting machine, to which hole a tree seedling with its root ball is typically planted with the planting machine. Generally, it is appropriate to pack the soil surface around the seedling after planting. The planting machine is typically fastened to an articulated boom of a working machine, such as a forest tractor. The planting machine is thus supplied by the working machine, for example through pressurized air, hydraulic and power cables. The planting machine is thus remote controllable from the control cabin of the working machine.

Tree seedlings waiting for planting are stored in planting machines in many different ways. Patent application FI 200135337 A discloses a planting machine, in which the seedlings are taken from a stationary seedling storage of the device to an elongated magazine acting as an intermediate storage. The magazine is adapted to move longitudinally back and forth with the aid of an actuator. From the intermediate storage the seedlings are guided to the planting devices.

The prior art planting machines are often inefficient and the handling of seedlings is complex in them. The handling, i.e. the transferring of the seedlings can harm the seedlings and their root balls.

OBJECT OF THE INVENTION

The object of the present invention is to reduce or even eliminate the above-mentioned problems appearing in prior art.

An object of the present invention is to achieve a seedling planting machine, in which seedlings are handled as little as possible before planting.

An object of the present invention is to provide a seedling planting machine, which operates more efficiently than the ones before.

An object of the present invention is to provide a seedling planting machine especially suitable for eucalyptus and sugar cane.

BRIEF DESCRIPTION OF THE INVENTION

In order to achieve the above-mentioned objects, among others, the method in the seedling planting machine and the seedling planting machine according to the invention as well as other objects of the invention are characterised by what is presented in the characterising parts of the enclosed independent claims.

The application examples and advantages mentioned in this text relate, where applicable, to both the method and the seedling planting machine according to the invention, even if it is not always specifically mentioned.

In a typical method according to the invention, in the seedling planting machine seedlings are extracted from the seedling storage to be transferred to planting means of a planting machine. The method comprises holding a seedling storage in its place on a storage track of the planting machine by first holding elements, for example, by a first toothed bar.

transferring the seedling storage on the storage track of the planting machine by moving second holding elements, for example a second toothed bar, in relation to the first holding elements and the storage track so that the seedling storage comes into contact with the second holding elements, the seedling storage is transferred to be supported by the second holding elements and the seedling storage is transferred a transfer distance forwards on the storage track, the seedling storage is transferred to be supported by the first holding elements, the seedling storage is detached from the second holding elements.

A typical seedling planting machine according to the invention comprises a frame and supported thereon planting means, a seedling storage and seedling handling means for extracting seedlings from the seedling storage and transferring them to the planting means. Furthermore, the planting machine comprises at least a storage track, which is adapted to hold and guide one or more seedling storages, first holding elements, for example a first toothed bar, by which first holding elements the seedling storage is arranged to be held in its place on the storage track, second holding elements, for example a second toothed bar, which second holding elements are arranged to be moved in relation to the first holding elements and to the storage track, and by which the seedling storage is transferred on the storage track of the planting machine.

An embodiment of the invention may, for example, be described as follows:

the first holding elements support the seedling storage on the storage track of the planting machine so that at least one seedling is in a position, from where the seedling handling means can extract the seedling and transfer it to the planting means. When there are no seedlings in the position of the seedling handling means, the seedling storage is transferred by moving the second holding elements so that the seedling storage is transferred from being supported by the first holding elements to be supported by the second holding elements, after which the second holding elements and the seedling storage supported by them is transferred a transfer distance forwards on the storage track. The second holding elements are now transferred so that the seedling storage returns back to be supported by the first holding elements, to a transfer distance from its previous position. Now at least one seedling is in a position, from where the seedling handling means can extract the seedling and transfer it to the planting means.

The transfer distance can be for example a distance of the storage positions of two adjacent seedlings in the seedling storage in the direction of the storage track or for example a multiplication thereof. The transfer distance can be for example 40-500 mm, 50-200 mm, 50-80 mm or 60-70 mm.

Thus, it has now been found, how with the aid of a simple mechanism, the seedling planting device does not need any stationary seedling storage. Now the seedling storage itself, such as a seedling box, can be transferred on the storage track of the planting machine always to a suitable position. Several successive seedling storages can be arranged on the storage track and always when the beginning of the storage track is emptied, a new seedling storage can be placed thereon. When a movable seedling storage is brought to the planting machine directly from a plant nursery, seedlings do not need to be handled at all before the seedling handling means extract a seedling and transfer it to the planting means.

A method and a planting machine according to the invention are especially well suited for tree seedlings, especially for light seedlings, such as for eucalyptus and sugar cane seedlings.

The planting means and the seedling handling means for extracting seedlings from a seedling storage and transferring them to the planting means represent prior art and are not as such an object of this invention, so they are not described in this text in a more detailed manner.

The storage track, which is adapted to hold and guide one or more seedling storages, can be for example a platform having a width of approximately one seedling storage, on which platform the seedling storages are arranged to be successively movable. The length of the storage track can be for example 150-400 cm or 200-300 cm. The width of the storage track can be for example 60-120 cm or 80-100 mm. The storage track can accommodate successively, for example at least four, 2-10 or 4-8 seedling storages, such as seedling boxes. A seedling planting machine according to the invention can have one or more storage tracks.

The first holding elements by which the seedling storage is arranged to be held in its place on the storage track can be for example a toothed bar or a toothed plate made of e.g. metal or plastic. The first holding elements can comprise one or more, e.g. 1-4, successively arranged elements. One element, such as a toothed plate, can have a length of for example 30-100 cm or 40-60 cm. One element can have a height of for example 4-10 cm in the direction of the toothing and a thickness of for example 1-5 cm.

The second holding elements, which are arranged to be moved in relation to the first holding elements and in relation to the storage track and by which the seedling storage is transferred on the storage track of the planting machine, can be for example a toothed bar or a toothed plate made of e.g. metal or plastic. The second holding elements can comprise one or more, e.g. 1-4, successively arranged elements. One element, such as a toothed plate, can have a length of for example 30-100 cm or 40-60 cm. One element can have a height of for example 4-10 cm and a thickness of for example 1-5 cm.

In an embodiment of the invention the first and the second holding elements are toothed by toothings having mainly same sizes. The form of the toothing is such that the seedling storage which is designed to be in connection with it is firmly supported by it. In an application the outer edge of the seedling storage is formed of peripheries of round seedling storage tubes, the radius of which peripheries is r. The toothing can thus be formed of circular arches compatible with them, having substantially the same radius r. Said r is in some applications 25-35 mm or 30-32 mm.

In an application of the invention the planting machine comprises transfer means of the second holding elements to be connected to the second holding elements and supported on the frame. These transfer means can comprise for example one or more hydraulic cylinders, toothed chains or wide-threaded screws. The transfer means of the second holding elements get their force by e.g. a compressed-air, a hydraulic or an electric motor, to which the compressed air, hydraulic or electric power is transferred for example from a working machine to which the planting machine is connected.

In an application of the invention the transfer means of the second holding elements are arranged to lift the second holding elements from below the first holding elements above them, to transfer the second holding elements a transfer distance forwards on the storage track and then to lower the second holding elements from above the first holding elements below them. Such holding elements can comprise for example substantially upwards directed pins or toothings. Thus, gravity attends to at least a part of the force, which during the normal use holds the seedling storage in its place in the holding elements.

In an application of the invention, for holding the seedling storage firmly in the first and/or the second holding elements, a force directed towards the holding elements, for example downwards, is directed to the seedling storage during the holding in its place and/or transferring. Thus, the seedling planting machine comprises means for directing to the seedling storage the force directed towards the holding elements, for example downwards, for holding the seedling storage firmly in the first and/or second holding elements. The force directed towards the holding elements, for example downwards, can be produced with a counterpart, such as a counterpart iron. The counterpart can be stationary in relation to the frame or it can for example press the seedling storage flexibly by a springback factor. The counterpart can be located, for example, to the opposite side of the first holding elements of the storage track. This way the seedling storage remains well in its place on the storage track.

In an application of the invention, gravity acts partly or entirely as the force directed downwards during the holding of the seedling storage in its place and/or transferring, which force holds the seedling storage firmly in the first and/or the second holding elements. Gravity can press the above-mentioned counterpart downwards. On the other hand, gravity can in certain cases also alone suffice to direct a sufficient force to the seeding storage.

In an application of the invention the second holding elements are transferred a transfer distance backwards after being detached from the seedling storage.

In an application of the invention the seedling storage is transferred forwards on the storage track, when the seedling storage or its certain position is emptying.

In an application of the invention the seedling storage is being held in its place during the extracting of seedlings.

In an application of the invention the seedling planting machine comprises a fastening device for attaching it to a controllable articulated boom of a working machine. The fastening device can comprise means for connecting the compressed-air, hydraulic or electric cables from the working machine to the corresponding cables of the planting machine.

In an application of the invention the seedling storage comprises forms, such as a toothing or openings or recesses, suitable for the first and the second holding elements.

In an application of the invention the seedling storage comprises a box or a tray having a bottom plate as well as edges, suitable for the seedlings. For example a seedling box can act as a seedling storage. The seedling storage can comprise for example 6×10 seedling positions. The width of the seedling box can be for example 35-40 cm, the length can be for example 60-70 cm and the height of the edges can be for example 14-20 cm.

In an application of the invention the bottom plate of the seedling storage is removable. The seedling storage equipped with a removable bottom plate makes it possible, that when the seedling storage is placed on the storage track, to remove the bottom plate of the seedling storage, whereby the seedlings rest against the bottom of the storage track. The seedling handling means can thus extract seedlings from the seedling storage through an opening in the bottom of the storage track and then transfer the seedlings to the planting means.

In an application of the invention the storage track is adapted to hold and guide one or more seedling storages so that the bottom of the seedling storage or the level of the removed bottom is during the use of the planting machine for the most of the time in a direction substantially deviating from the horizontal level, preferably in an angle of 10-90 degrees, 10-80 degrees, 30-80 degrees or 45-80 degrees in relation to the horizontal level. The seedlings in the seedling storage which is inclined in relation to the horizontal level are not upright, but lie at least partly and support each other. This reduces bending of some seedlings. A seedling which is inclined or in a horizontal level is easily extracted for example by ordinary seedling handling means, such as a suction pipe, acting by suction and blowing.

In an embodiment, in the method and in the device, the first and the second holding elements can be replaced by a conveyor screw to be held in connection with the seedling storage. Thus, the screw threads of the conveyor screw fit to the forms of the seedling storage so that upon rotating the conveyor screw about its axis the seedling storage is transferred on the storage track a distance determined by the rotating movement of the screw.

In an embodiment, in the method and in the device, the first and the second holding elements can be replaced by a conveyor belt to be held in connection with the seedling storage. Upon moving the conveyor belt the seedling storage is transferred on the storage track a distance determined by the movement of the conveyor belt. There can be one conveyor belt, for example against the lower surface of the seedling storage. There can be several conveyor belts, for example on the opposite sides of the seedling storage, a first conveyor belt can be e.g. in connection with the upper edge of the seedling storage and a second conveyor belt can be in connection with the lower edge of the seedling storage.

BRIEF DESCRIPTION OF THE FIGURES

The invention is described in more detail below with reference to the enclosed schematic drawing, in which.

DETAILED DESCRIPTION OF THE EXAMPLES OF THE FIGURES

For the sake of clarity, in the figures, same reference numbers are used for some corresponding parts.

Figure 1:
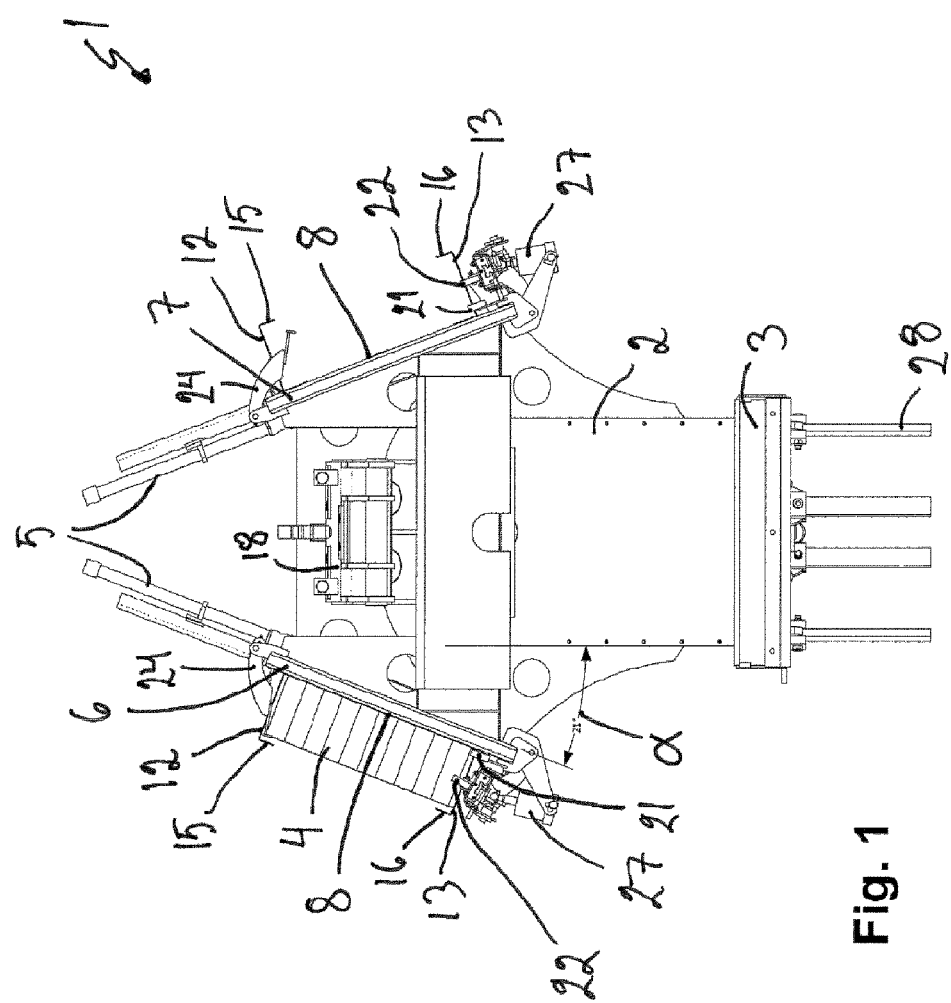
FIG. 1 shows a device according to the invention seen from one end.
Figure 2:
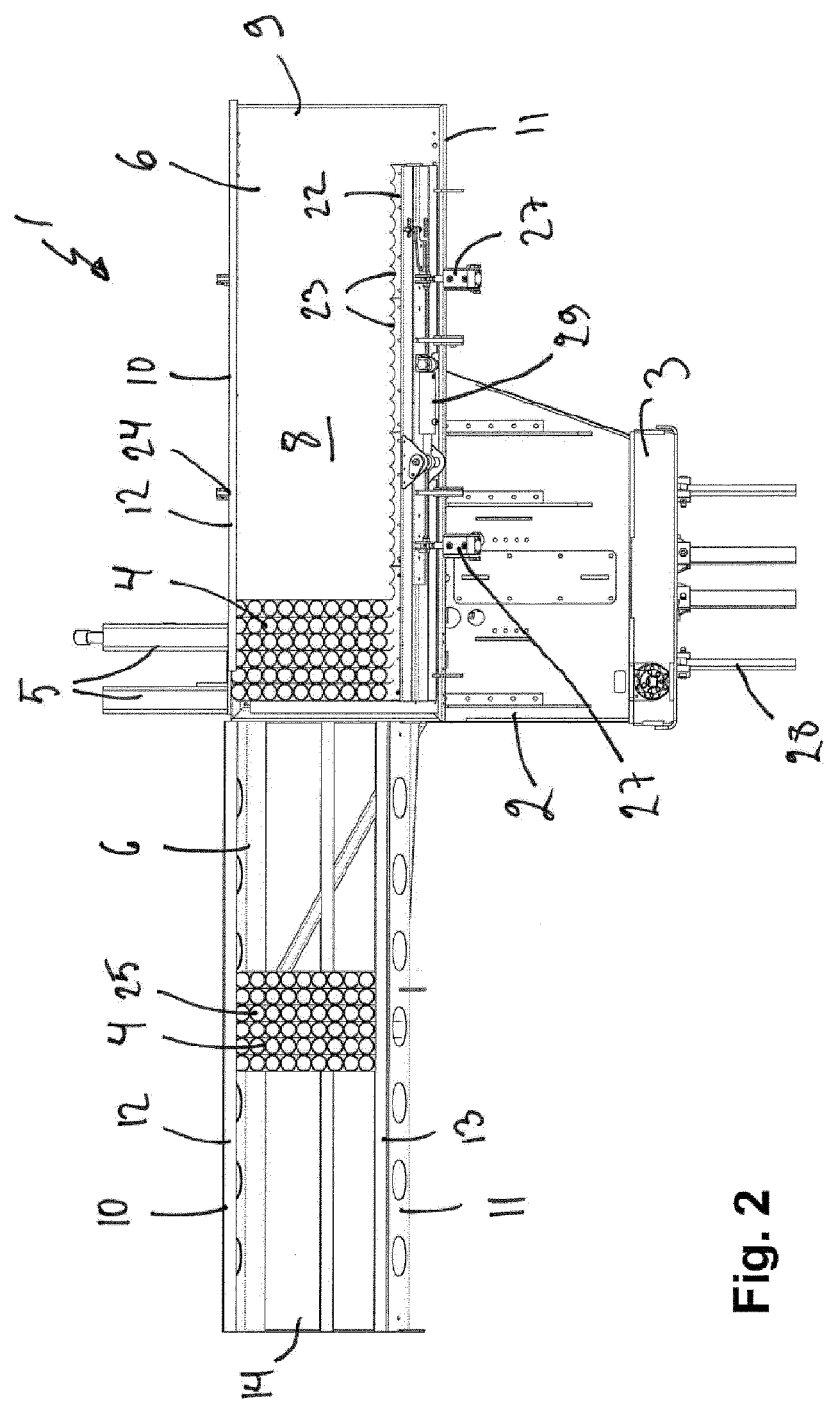
FIG. 2 shows a device according to the invention seen from the side.
Figure 3:
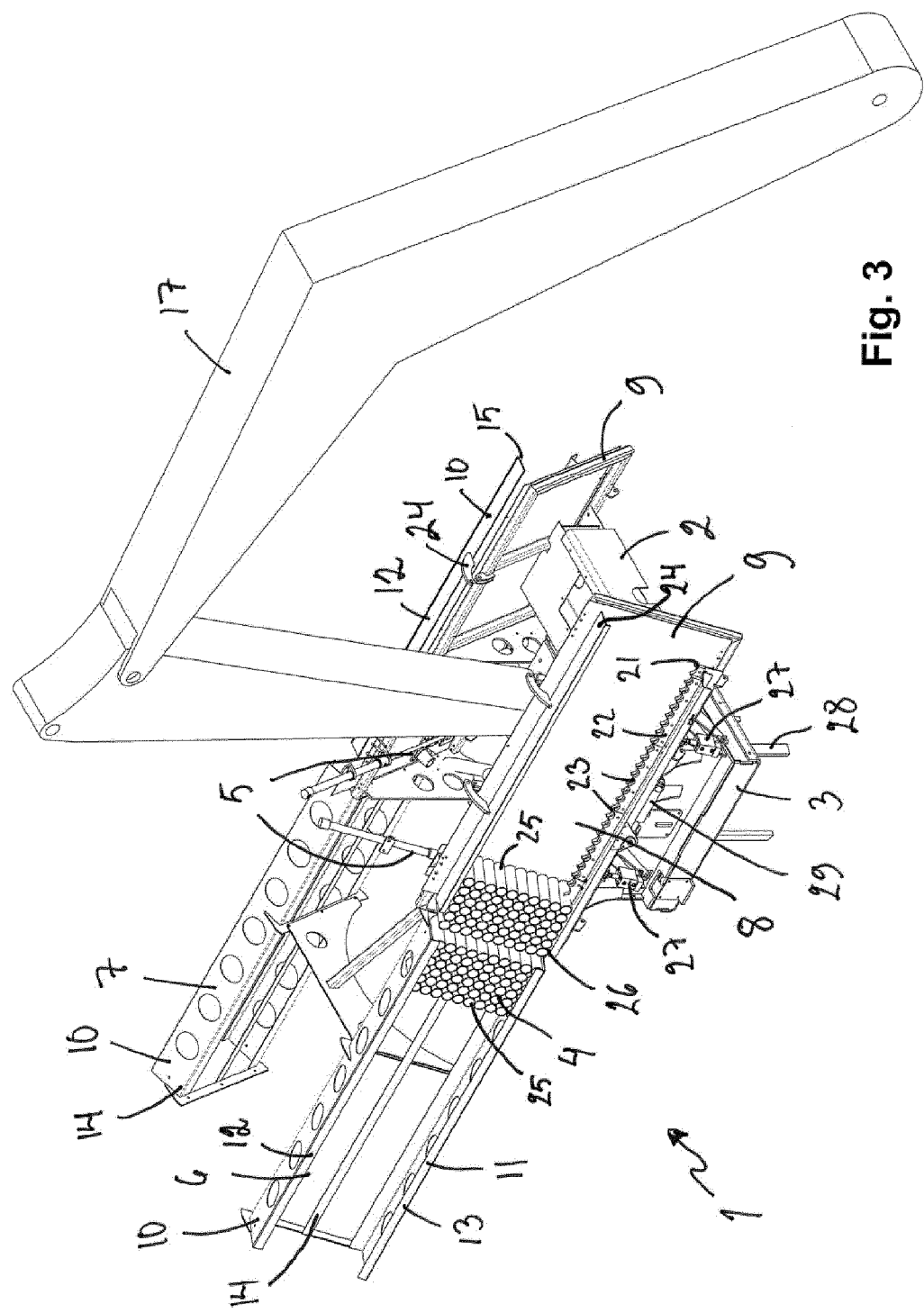
FIG. 3 shows a device according to the invention seen diagonally from above and attached to an articulated boom of a working machine.

FIGS. 1, 2 and 3 show a planting machine 1 for tree seedlings, which planting machine comprises a frame 2 and supported thereon planting means 3, seedling storages, i.e. seedling boxes 4 in the example of the figure and seedling handling means 5 for extracting seedlings from the seedling storage 4 and transferring them to the planting means 3 as well as a first storage track 6 and a second storage track 7. The storage tracks 6, 7 are adapted to guide the movement of the seedling storages 4 in the planting machine 1. In this text, mainly only the operation of the first storage track 6 is described, since the storage tracks located on different sides of the frame 2 correspond to each other in their structure and operation.

A metallic platform 8 acts as a bottom of the storage track 6, on which platform and in the direction of which, i.e. in the direction of the platform of the storage track, the seedling boxes 4 move along the storage track 6. The longitudinal direction of the storage track is called the direction of the storage track. The seedling boxes 4 are brought to the first end 9 of the storage track, from which end they are transferred during the operation of the planting machine 1 between and along rails 12, 13 arranged in direction of the storage track in the upper edge 10 and in the lower edge 11 of the storage track forwards towards the second end 14 of the storage track. In the example of the Figures, the storage tracks 6 and 7 are attached to the frame 2 to an inclined position, so that the seedling boxes 4 on the storage track are during the normal use of the planting machine in an angle in relation to the horizontal level. An angle α, which is in the example 21 degrees, formed by the vertical and the platform 8 of the bottom plate of the storage track, is drawn in the Figure. The rails 12 and 13 of the upper edge and the lower edge have folds 15 and 16, which enhance the holding of the seedling box 4 on the track 6.

A controllable articulated boom 17 of a working machine, which boom is attached to the fastening device 18, is drawn in the FIG. 3. The fastening device 18 comprises the necessary means for connecting the compressed-air, hydraulic or electric cables from the working machine to the corresponding cables of the planting machine. The working machine, such as a tractor or forest machine, is not shown.

The first holding elements 21 and the second holding elements 22 are fastened, in the first end 9 of the storage track, at the position of the frame 2, to the lower edge 11 of the storage track. In the example of the Figures, both holding elements are made of toothed plastic plates, in which the toothings 23, i.e. the slots and protrusions are identical. The holding elements could be different from each other.

The first holding elements 21 are firmly fastened to the frame 2 of the planting machine. The second holding elements 22 are located in the example of the Figures in alignment with the first holding elements 21, but farther from the platform 8, i.e. from the frame 2. The second holding elements 22 are movable in relation to the frame 2 and thus also in relation to the first holding elements 21 in the direction of the platform 8 of the storage track.

In the upper edge 10 of the storage track 6 there is a counterpart 24, which is pivoted to the upper edge and spring-mounted so that the counterpart 24 presses the seedling box 4 on the storage track in its position downwards towards the holding elements 21 and 22. However, the counterpart 24 and its springing, allow the movement of the seedling box 4 in the direction of the platform 8 of the storage track. Also gravity directing to the counterpart 24 presses the counterpart 24 downwards and thus directs to the seedling box 4 a force which keeps it on the track. Gravity can replace said springing entirely or partly as the force pressing the counterpart 24 downwards.

In the example of the figures, the edges of the seedling box 4, for example the lower edge 26, have forms, i.e. peripheries of round seedling storage tubes 25, corresponding to the toothing 23 of the first and the second holding elements. The radius of the peripheries is ca. 31 mm, so in the example of the Figures also the recesses of the toothings 23 having a form of a circular arch have a radius of ca. 31 mm, or little more, for example 32 mm or 33 mm. This way the teeth 23 of the toothing fit to the forms of the edge of the seedling storage, and the first holding elements 21 do not thus allow the movement of the seedling box 4 supported by them in the direction of the storage track.

The second holding elements 22 are fastened to the frame 2 to be moved by the hydraulic cylinders 27 and 29 along a track having a form of a circle or an oval in the direction of the platform 8 of the storage track. When the second holding elements 22 are lifted upwards in the direction of the platform 8 by the hydraulic cylinders 27, the seedling box 4 is transferred to be supported by them, away from the contact with the first holding elements 21. A mainly horizontal hydraulic cylinder 29 transfers the second holding elements 22, and simultaneously thus the seedling box 4, forwards in the direction of the storage track 6 towards the second end 14 of the storage track. When the second holding elements 22 are again lowered to the level of the first holding elements 21, the seedling box 4 remains again to be supported by the first holding elements 21 and firmly in its place. Now, the second holding elements 22 are returned back to their original position lower down. In the above-described way, the counterpart 24 of the upper edge of the storage track allows the movement of the seedling box 4 simultaneously holding the seedling box 4 firmly on the storage track 6. The lifting and lowering movement can be performed non-simultaneously with the horizontal movement. The hydraulic cylinders 27 and 29 can also act simultaneously with each other, whereby the second holding elements 22 and the seedling box 4 can be transferred along the arched track.

The storage tracks 6 and 7 can be arranged in many different ways. For example, the storage track can be mainly in the horizontal level.

In the example of the Figures, seedling boxes 4, which have been filled elsewhere and have 6×10 seedling positions, are used as seedling storages. When the seedling box has been placed on the platform 8, in connection with the first and the second holding elements 21 and 22, the removable bottom plate (not shown) of the seedling box is removed. In the bottom of the seedling boxes, there is now an opening (not shown) in the position of each seedling storage tube 25, through which opening the seedling handling means 5, for example acting by suction, transfers the seedlings to the planting device 3, which plants the seedling to a hole made by its tilling devices 28. On the storage track 6, 7 on both sides of the planting device 1, there is in its first end space for example for five or six full seedling boxes 4. The seedling boxes 4 moved by the second holding elements 22 push empty seedling boxes 4 towards the second end 14 of the storage track. The empty seedling boxes 4 fall from the second end 14 of the storage track, and they are transferred for example to a storage container (not shown). The invention can be used with different seedling boxes or other seedling storages.

In order for the structure and the operation of the planting device 1 to be seen more clearly, only some seedling boxes 4 in different positions of the planting device 1 are shown in the Figures. In a normal operation situation one or both storage tracks 6 and 7 would typically have several storage boxes 4 successively engaged to each other.

The seedling handling means, the planting devices, the soil tilling devices, the fastening of the planting machine to the working machine, the articulated boom of the working machine, the power sources needed by the device are not as such an object of this invention. The present invention can be used with different seedling handling devices, planting devices, soil tilling devices and working machines.

It is not intended to limit the scope of the invention to the examples mentioned in the application, but the scope is defined by the independent claims. The dependent claims disclose some embodiments of the invention.

The invention claimed is:

1. A method in a seedling planting machine, in which seedlings are extracted from a seedling storage to be transferred to planting means of the planting machine, wherein the method comprises:
    holding the seedling storage in its place on a storage track of the planting machine with first holding elements,
    transferring the seedling storage on the storage track of the planting machine by moving second holding elements in relation to the first holding elements and in relation to the storage track,
wherein the transferring of the seedling storage is performed, so that
    the seedling storage comes into contact with the second holding elements,
    the seedling storage is transferred from being supported by the first holding elements to be supported by the second holding elements,
    the seedling storage is transferred a transfer distance forward on the storage track by the second holding elements,
    the second holding elements transfer the seedling storage back to the first holding elements, and
    the seedling storage is detached from the second holding elements,
    wherein the planting machine comprises transfer devices of the second holding elements supported on a frame, which transfer devices are arranged to lift the second holding elements from below the first holding elements above them, to transfer the second holding elements a transfer distance forward on the storage track and then to lower the second holding elements from above the first holding elements below them, and
    wherein the seedling planting machine comprises means for directing to the seedling storage a force directed downwards for holding it firmly in the first holding elements and/or in the second holding elements.

2. The method according to claim 1, wherein the first holding elements are made up by a first toothed bar and the second holding elements are made up by a second toothed bar.

3. The method according to claim 1, wherein
    after being detached from the seedling storage, transferring the second holding elements a transfer distance backwards.

4. The method according to claim 1, comprising a step of:
    transferring the seedling storage forwards on the storage track when the seedling storage or a certain position in it is emptied.

5. The method according to claim 1, wherein the method comprises a step of:
    holding the seedling storage in its place when the seedlings are extracted.

6. The method according to claim 1, wherein the method comprises a step of:

directing to the seedling storage a force directed downwards during the holding in its place and/or transferring for holding the seedling storage firmly in the first holding elements and/or in the second holding elements.

7. The method according to claim 1, wherein transferring the seedling storage on the storage track of the planting machine by lifting the second holding elements from below the first holding elements above them, by transferring the second holding elements a transfer distance forwards on the storage track and by lowering then the second holding elements from above the first holding elements below them.

8. The method according to claim 1, wherein holding and guiding the seedling storage on the storage track so that the bottom of the seedling storage or the level of the bottom is during the use of the planting machine for the most of the time in a direction substantially deviating from the horizontal level, preferably in an angle of 10-90 degrees, 10-80 degrees, 30-80 degrees or 45-80 degrees in relation to the horizontal level.

9. A seedling planting machine, which comprises a frame and supported thereon planting means, a seedling storage, seedling handling means for extracting seedlings from the seedling storage and transferring them to the planting means, wherein the planting machine comprises:

a storage track, which is adapted to hold and guide one or more seedling storages, first holding elements by which the seedling storage is arranged to be held in its place on the storage track, second holding elements, which are arranged to be moved in relation to the first holding elements and in relation the storage track, and the seedling storage is transferred on the storage track of the planting machine, wherein the second holding elements are arranged to transfer the seedling storage a transfer distance forward on the storage track, wherein the planting machine comprises transfer devices of the second holding elements supported on the frame, which transfer devices are arranged to lift the second holding elements from below the first holding elements above them, to transfer the second holding elements a transfer distance forward on the storage track and then to lower the second holding elements from above the first holding elements below them, and wherein the seedling planting machine comprises means for directing to the seedling storage a force directed downwards for holding it firmly in the first holding elements and/or in the second holding elements.

10. The seedling planting machine according to claim 9, wherein the first holding elements are made up by a first toothed bar and the second holding elements are made up by a second toothed bar.

11. The seedling planting machine according to claim 9, wherein the seedling planting machine comprises a fastening device for fastening the seedling planting machine to a controllable articulated boom of a working machine.

12. The seedling planting machine according to claim 9, wherein the seedling storage comprises forms, such as a toothing or openings or recesses, compatible with the first holding elements and the second holding elements.

13. The seedling planting machine according to claim 9, wherein seedling storage comprises a tray suitable for the seedlings, which tray has a bottom or a bottom plate, which is preferably removable, and edges.

14. The seedling planting machine according to claim 9, wherein the storage track is adapted to hold and guide one or more seedling storages during the use of the planting machine for the most of the time in a direction substantially deviating from the horizontal level, preferably in an angle of 10-90 degrees, 10-80 degrees, 30-80 degrees or 45-80 degrees in relation to the horizontal level.

15. The seedling planting machine according to claim 9, wherein the outer edge of the seedling storage is formed of peripheries of round seedling storage tubes, and the toothing of the first and second holding elements is formed of circular arches compatible with said peripheries, said peripheries and said circular arches having substantially the same radius.

* * * * *